United States Patent
Janssen et al.

(10) Patent No.: US 8,775,443 B2
(45) Date of Patent: Jul. 8, 2014

(54) RANKING OF BUSINESS OBJECTS FOR SEARCH ENGINES

(75) Inventors: Tatjana Janssen, Bad Nenndorf (DE); Uwe Kindsvogel, Ubstadt-Weiher (DE); Klaus Irle, Walldorf (DE)

(73) Assignee: SAP AG, Walldorf (DE)

(*) Notice: Subject to any disclaimer, the term of this patent is extended or adjusted under 35 U.S.C. 154(b) by 3168 days.

(21) Appl. No.: 10/912,118

(22) Filed: Aug. 6, 2004

(65) Prior Publication Data

US 2005/0080774 A1 Apr. 14, 2005

Related U.S. Application Data

(60) Provisional application No. 60/492,962, filed on Aug. 7, 2003.

(51) Int. Cl.
*G06F 17/30* (2006.01)

(52) U.S. Cl.
USPC ........... 707/752; 707/748; 707/754; 707/755; 707/756; 717/100; 717/101; 717/102; 717/103

(58) Field of Classification Search
CPC ................................ G06F 17/30; G06F 17/00
See application file for complete search history.

(56) References Cited

U.S. PATENT DOCUMENTS

| | | | | |
|---|---|---|---|---|
| 5,875,446 A * | 2/1999 | Brown et al. | ............... | 1/1 |
| 6,094,649 A * | 7/2000 | Bowen et al. | ............... | 707/3 |
| 6,285,999 B1 * | 9/2001 | Page | ............... | 707/5 |
| 6,526,440 B1 * | 2/2003 | Bharat | ............... | 709/219 |
| 6,714,939 B2 * | 3/2004 | Saldanha et al. | ............... | 707/102 |
| 6,834,276 B1 * | 12/2004 | Jensen et al. | ............... | 707/2 |
| 6,999,648 B2 * | 2/2006 | Oikawa et al. | ............... | 385/17 |
| 7,024,404 B1 * | 4/2006 | Gerasoulis et al. | ............... | 707/3 |
| 7,133,867 B2 * | 11/2006 | Irle et al. | ............... | 707/4 |
| 7,248,171 B2 * | 7/2007 | Mishelevich | ............... | 340/573.1 |
| 8,370,362 B2 * | 2/2013 | Szabo | ............... | 707/739 |
| 2002/0013779 A1 * | 1/2002 | Sridhar | ............... | 707/4 |
| 2002/0169583 A1 * | 11/2002 | Gutta et al. | ............... | 702/188 |
| 2002/0169770 A1 * | 11/2002 | Kim et al. | ............... | 707/5 |
| 2002/0184269 A1 * | 12/2002 | Imagou | ............... | 707/523 |
| 2003/0046098 A1 * | 3/2003 | Kim | ............... | 705/1 |
| 2003/0078838 A1 * | 4/2003 | Szmanda | ............... | 705/14 |
| 2003/0182315 A1 * | 9/2003 | Plastina et al. | ............... | 707/200 |
| 2004/0162816 A1 * | 8/2004 | Irle et al. | ............... | 707/3 |
| 2004/0165816 A1 * | 8/2004 | Oikawa et al. | ............... | 385/17 |
| 2005/0280544 A1 * | 12/2005 | Mishelevich | ............... | 340/573.1 |

OTHER PUBLICATIONS

Su, Stanley Y. W., et al, "An Information Infrastructure and E-Services for Supporting Internet-based Scalable E-business Enterprises," Sep. 4-7, 2001, IEEE Proceedings of the 5th Internaitonal Enterprise Distributed Object Computing Conference *EDOC '01), pp. 2-13 (12 total pages).*

(Continued)

*Primary Examiner* — Farhan Syed
(74) *Attorney, Agent, or Firm* — Finnegan, Henderson, Farabow, Garrett & Dunner, L.L.P.

(57) ABSTRACT

Computer-implemented methods, systems and products are provided for calculating a ranking value for business objects. Creating the ranking value for business objects may comprise calculating the number of references a business object is referenced to, mapping the business object together with the number of references of the business object into a document structure, and providing a ranking value according to the number of references.

51 Claims, 7 Drawing Sheets

(56) References Cited

OTHER PUBLICATIONS

Ciaccia, P., et al, "Adding flexibility to structure similarity queries on XML data," Oct. 2002, Proceedings of the 5th International Conference on Flexible Query Answering Systems (FQAS 2002), pp. 124-139.*

Alon Raskin, "Business Object Repository," SAP Genie.com, Sep. 8, 2000, retrieved from the Internet: http://sapgenie.com/abap/bor.htm on Mar. 2, 2006, pp. 1-7.

EPO Communication and Search Report, dated Mar. 21, 2006 (4 pages).

* cited by examiner

RANKING OF BUSINESS OBJECTS FOR SEARCH ENGINES

CROSS REFERENCE TO RELATED APPLICATIONS

This application claims the benefit of priority of U.S. Provisional Patent Application No. 60/492,962, filed Aug. 7, 2003, the disclosure of which is expressly incorporated herein by reference to its entirety.

BACKGROUND

1. Field of the Invention

The present invention generally relates to data processing and retrieval. More particularly, the invention relates to computer-implemented methods, systems and products for creating a ranking value of a business object according to its relevance for a search query.

2. Background Information

In enterprise resource planning (ERP) software products, data objects are stored within structured business objects. Business objects may, for instance be data objects, which can relate to various areas within a company, for example, client data, factory structures, machine structures, production sequences, lists of materials, lists of staff and many others. The structure of the business data objects may be predetermined by the real conditions within the company or for maintenance of certain areas within the company. The business objects may insofar simulate the real structures.

Data objects may represent real world objects within a particular company structure. The data objects may comprise attributes and values, and insofar allow computer-aided planning, maintenance and the operation of a company with the aid of ERP software.

Various business objects can be interlinked and can thus represent an entire company network in an object structure, which can be hierarchical. The mesh of objects should insofar represent the actual structure of the company as far as possible.

In order to search for information within the data objects, the user requires a user-friendly user interface, as well as fast and reliable access to the data. With conventional search engines, such as those available on the Internet, for example, only document-like objects are almost exclusively searchable and displayed. These document-like objects, for example, text documents, are only slightly structured and can be searched with the aid of simple algorithms. The content of the text documents can be indexed automatically in most cases. The search engines access the created index during their search.

During the search, the keyword being sought is searched for in the index. Searching in the index allows attribute search or full text search. In the event of a match, a link to the corresponding text document may be put out. The user may then directly access the text document via the respective link.

In many cases, a search engine retrieves, upon a search, from an index a huge amount of different documents, which match with the search query. To allow users to evaluate the results, it is known to provide ranking values together with the search results. The ranking values allow sorting the search results according to their relevance for the user. FIG. 2 depicts such a search using-search engines.

As illustrated in FIG. 2, a search engine 100 may comprise a database 102, an indexer 104, a crawler 106, and ranking means 108. Further depicted is a variety of web sites 110, a search engine user interface 112 and a user 114.

The search engine may have to be prepared prior to processing a search query. In this case, web sites 110 may be searched by the crawler 106. The crawler provides the indexer 104 with all found web sites 110. The found web sites 110 are indexed by the indexer 104. The indexer 104 creates an index of the content of the web sites 110. Further, the indexer 104 references the corresponding websites by, for example, their URL-references.

After indexing the documents, search engine 100 may be ready for processing search queries. In such a case, user 114 may start a search query 116 via search engine user interface 112. The search query 116 initiates a search routine within search engine 100. Search engine 100 tries to find documents that match best with the search query 116. The hitlist may be passed to ranking means 108. At this point in time, the hitlist might not be sorted, yet. Ranking means 108 may try to calculate the relevance of each document to provide user 114 with a sorted hitlist. According to the results of the ranking means 108, the hitlist is sorted depending on a relevance of the documents. The sorted hitlist is passed to search engine user interface 112. Together with ranking information and links to the corresponding web sites 110, the hitlist is presented to the user. The user may choose one of the corresponding links to retrieve the corresponding web site 110. One exemplary embodiment presents at the top of the hitlist the most relevant documents. The relevance may decrease the lower the position of the reference in the sorted hitlist.

A central functionality of the search engine is the ranking algorithm. For using the ranking algorithm, the documents are searched for certain keywords and index terms. Some index terms and keywords are more relevant for a search query than others. The ranking value depends to the corresponding ranking algorithm. As demonstrated by Baeza-Yates, R., Ribiero-Neto, B., "Modern Information Retrieval", Addison Wesley (1999) and Frakes, W./Baeza-Yates, R., "Information Retrieval: Data Structures & Algorithms" (1999), different ranking algorithms using term frequencies and inverse document frequencies are known.

A further ranking algorithm is known from U.S. Pat. No. 6,526,440, where an initial set of relevant documents is obtained. For the initial set of documents, a relevance score is calculated for each document. A local score value is calculated quantifying an amount that the documents are referenced by the documents in the initial set of documents. The relevance scores of the documents are refined. According to this algorithm, the reference of documents to other documents is used for calculating a ranking value. The more documents reference a certain document, the more important this certain document is ranked.

A drawback of the proposed methods is that they only allow calculating ranking values for plain documents. In particular, business objects are more complex than plain documents. Business objects may have multiple references to each other. Business objects may further comprise master data and/or dynamic data and may comprise a variety of attributes.

It should be possible to provide a ranking algorithm taking the references between business objects into account.

SUMMARY OF THE INVENTION

In accordance with an aspect of the invention, a computer-implemented method is provided for creating a ranking value of a business object according to its relevance for a search query. The computer-implemented method may include: determining a number of references value according to a number of references to the business object within other business objects, mapping the business object into a document structure, mapping the number of references value into the document structure, indexing the document structure for use in a search engine, and calculating the ranking value based on the number of references value.

In accordance with one embodiment, the number of references value represents the number of business objects, which reference to a certain business object. The more often a certain business object is referenced to, the higher this value.

According to another embodiment, the number of references value is mapped into the document structure. The ranking value may insofar be calculated further depending on the number of references value. During mapping the business objects into the document structure, the number of references value to a certain object may be stored in the documents. By storing the number of references value within the document structure, it may be used for calculating the ranking value.

For instance, a product, which was bought by many customers, is favored by the customer and insofar may be ranked high. When searching for a product, it might be useful to rank the product according to the number of customer orders, e.g., the number of business objects of the type customer order referencing to this particular business object of the type product. A customer order is a business object and a product is a business object. Each customer order for a certain product may represent a reference to the product. Therefore, the business object product may be referenced by as many business objects of the type customer order, as orders have been placed for this product. The search query should show this product first, as this product is favored by customers.

According to one embodiment, attributes of a business object are mapped into attributes of the respective document structure.

In another embodiment, an additional object attribute representing a number of references value is defined within each business object. This object attribute may store the number of references to the particular business object.

In yet another embodiment, the business objects are searched for references to other business objects, and in case of a reference from another business object, the number of references value within the referenced business object is increased. The search for references to business objects may be carried out by different methods, as the business objects may also be within different systems and of different types. However, a high number of references may account for a high rating of the business object.

A business object may not have knowledge about whether it is referenced by other business objects. The business object only knows the number of business objects to which it references. But each business object should be indexed in the search engine with the number of references value, e.g., the number of business objects that reference it. As such, each business object may be required to be scanned for references to other business objects. In case any reference to another business object is found, the corresponding business object needs to be found and its number of references value can be increased, e.g., with a value of 1. Finding each of these business objects that are referenced by others can be very slow. One possible solution for accelerating the access of the business objects may be to define a hash-table and to put the business objects into the hash-table. Each business object may comprise an additional attribute for the number of references. By using the hash-table, the access to the business object may be accelerated. The hash-table may allow accessing the business object via its ID-number or link. For finding the number of references, each object within the hash-table may be checked sequentially. During the check the references of the objects to other objects may be verified. In case object A refers to object B, the number of references value within object B may be increased. This may be done by accessing the particular object B via its link retrieved from the hash-table. After that the search is continued at the position of object A. This method allows checking all objects for references to other objects. After checking all objects, the number of references to each object is known. This number may be stored within the number of references value attribute of the business object and then mapped into the document structure. It may insofar be used for calculating the ranking value.

In one embodiment, business partner attributes of business objects of the type business partner are mapped into the document structure, and the ranking value may further be based on the business partner attributes. A business partner attribute may be a business partner number, its name and title, its surname, its address and/or its status. In case business objects of business partner have the same number of references value, e.g., the ranking value based on the number of references value is the same, the business partner attributes may be checked for calculating the ranking value. Relevant for a business partner may be its activity, e.g., how often transactions are carried out with the particular business partner and how many orders are placed from this business object. The ranking value may also be calculated further depending on the completeness of the business partner. The degree of completeness may be determined from the amount of available contact data.

In one exemplary embodiment, the ranking value is calculated based on the completeness of the business partner attributes. Business partner objects, which data are mostly complete, should be ranked higher than these of business partner, which data are incomplete. Some business partner objects may comprise only a little amount of data, e.g., only name and surname. Other business partner objects may comprise a variety of data, such as the whole correspondence information. When accessing business partner objects the business partners which data are more complete should be ranked higher as these business partners are probably more important than the ones whose data are incomplete. The relative amount of data may thus be responsible for the ranking of the business partner object.

According to another embodiment, the business object comprises an environmental sustainability tag, and the environmental sustainability tag is mapped into the document structure and used for calculating the ranking value. In case an environmental sustainability tag is set, the product should be placed at the end of the list, e.g., should have a very low ranking value.

Each business object may comprise, in addition to standard attributes, a so-called set type. Set types may be specific attributes, which may be optional for the products. Some set types may be set by a master data management and other may be set by customers.

Set types, which may be defined by the customers, may also account for the ranking value. A customer may define a set type that may be used for calculating the ranking value of the business objects. In this case, the ranking value may also be calculated depending on a set type of a business object. In case the business object is of the defined set type or comprises the set type attribute, it may be ranked higher then another business object not comprising this set type.

According to another embodiment, the business object comprises a delete tag. The delete tag is mapped into the document structure, and the ranking value is further based on the delete tag. The delete tag may give information about the life cycle of a certain object. In case this tag is set, the particular object will be deleted from the system after a certain time. In such a case, the ranking value of this object should be low, as this object is probably not as important as permanently stored objects.

According to still another embodiment, the ranking value is of a value between 0 and 1. This accounts for the particularities of search engines, where ranking values usually are set between 0 and 1.

One embodiment provides the calculation of the ranking value as a quotient between the number of references to the business object and a maximum number of references to a business object. This quotient may be calculated as follows:

$$\text{Ref\_Value}(T) = \frac{\text{Num\_Ref\_}(T)}{\text{Max\_Num\_Ref}(T)}$$

where Ref_Value is the ranking value, Num_Ref is the number of reference to an object, T is the type of the objects, and Max_Num_Ref is the maximum number of references to objects of a certain object type.

In one further embodiment, a new ranking value is calculated based on an addition of a ranking value calculated by the search engine and the quotient ranking value. Each search engine may calculate a ranking value using known methods. The inventive method may add both ranking values according to, for example, the following:

$$\text{New\_Ranking\_Value}(T) = \frac{\text{SearchEngine\_Value}(T) + \text{Ref\_Value}(T)}{2}$$

where New_Ranking_Value(T) is the new ranking value of a object T, SearchEnging_Value (T) is the value calculated by the search engine according to known methods, and Ref_Value(T) is the ranking value calculated according to the inventive method. To ensure that the ranking value is between 0 and 1, the sum may be divided by two.

According to one embodiment, a new ranking value is calculated as a multiplication of a ranking value calculated by the search engine and the quotient ranking value. This ranking value may be calculated by:

$$\text{New\_Ranking\_Value}(T) = \text{SearchEngine\_Value}(T) * \text{Ref\_Value}(T)$$

In another embodiment, business objects are dedicated to certain business object types, and the number of references to the business object is calculated for business objects of the same type.

To account for differences between references between business objects of different types, the number of references within each business object type may be used. An object type may be, for example, a product, a parts list, an order list, or a business partner. Some object types may dominate the system and thus references to these object types are in abundance. In case the number of references of objects of certain types differ by a high amount, the algorithm to calculate the ranking value may be as follows:

$$\text{Ref\_Value}(T) = \left( \frac{\text{Num\_Ref}(ObjTyp1)}{\text{Max\_Num\_Ref}(ObjTyp1)} + \ldots + \frac{\text{Num\_Ref}(ObjTypN)}{\text{Max\_Num\_Ref}(ObjTypN)} \right)$$

where ObjTyp is a certain object type and N is a number of object types. To allow the calculation of a ranking value according to this method, the number references of an object for each object type may be stored as an attribute of the business object and mapped into the document structure.

To obtain a ranking value between 0 and 1, the result of the last equation may be divided by the number N of different object types, which is accounted for in this equation.

In one embodiment, the number of references to the business object for each business object type is divided by the maximum number of references to business objects of the respective types.

According to another embodiment, each user is characterized by a role, and the ranking value is calculated based on the number of references to business object and the role of the user.

Each user may be characterized by a certain role, e.g., the role gives the user access to certain parts of the system. In case the user is of the role "customer" it is more important for his search how often other customers accessed a certain product than how often material objects accessed the particular product. In case of a DVD-player, the DVD-player business object being accessed by more customers than others should be ranked higher.

Within each business object, an attribute for each business object type may stored. This will be more explicitly described below in conjunction with FIG. 9. Within this attribute, the number of references of an object of the particular object type may be stored. In one exemplary embodiment, according to the role of the user, the number of references of a certain object type may be more desirable than others.

According to another embodiment, references to a business object are weighted according to the role of the user and the ranking value is calculated based on the weighted number of references. The weighting may be done according to the role of the user. In case the user is of the role "customer", the weighting of references of business objects of the type customer may be weighted, for instance, higher than references of business objects of the business object type product.

For instance, the ranking value for business objects of certain roles may be calculated as follows:

$$\begin{array}{l}\text{New\_Rank\_Value}(A)\\ \text{(Roll Customer)}\end{array} = \left( \text{Rank\_Value}(A) + \frac{\text{Ref\_Num}(A)(\text{CustOrders})}{\text{Max\_Ref\_Num}(\text{CustOrders})} \right) / 2$$

This example allows calculating the new ranking value of a business object of the role "customer" and takes into account the number of customer orders. Ranking values for certain types of business partners may relate closer to references from business objects of certain types than to others.

In one embodiment, each business object comprises attributes and at least parts of the attribute are mapped into the document structure.

As certain attributes are more relevant for ranking the business objects than other, attributes relevant for said ranking value are mapped into said document structures according to one embodiment.

Another aspect of the invention relates a computer program product with a program stored for creating a ranking value of a business object according to its relevance for a search query, the program comprising instructions operable to cause a processor to: determine a number of references value according to a number of references to the business object within other business objects, map the business object into a document structure, map the number of references value into the document structure, index the document structure for use in a search engine, and calculate the ranking value based on the number of references to the business object.

A further aspect of the invention relates to a computer for creating a ranking value of a business object according to its relevance for a search query. The computer may include: determination means for determining a number of references value according to a number of references to the business object within other business objects; mapping means for mapping business object into a document structure, and mapping the number of references value into the document structure, indexing means for indexing the document structure for use in a search engine, and calculation means for calculating the ranking value depending on the number of references to the business object.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects consistent with the present invention. In the drawings.

DETAILED DESCRIPTION

Figure 1:
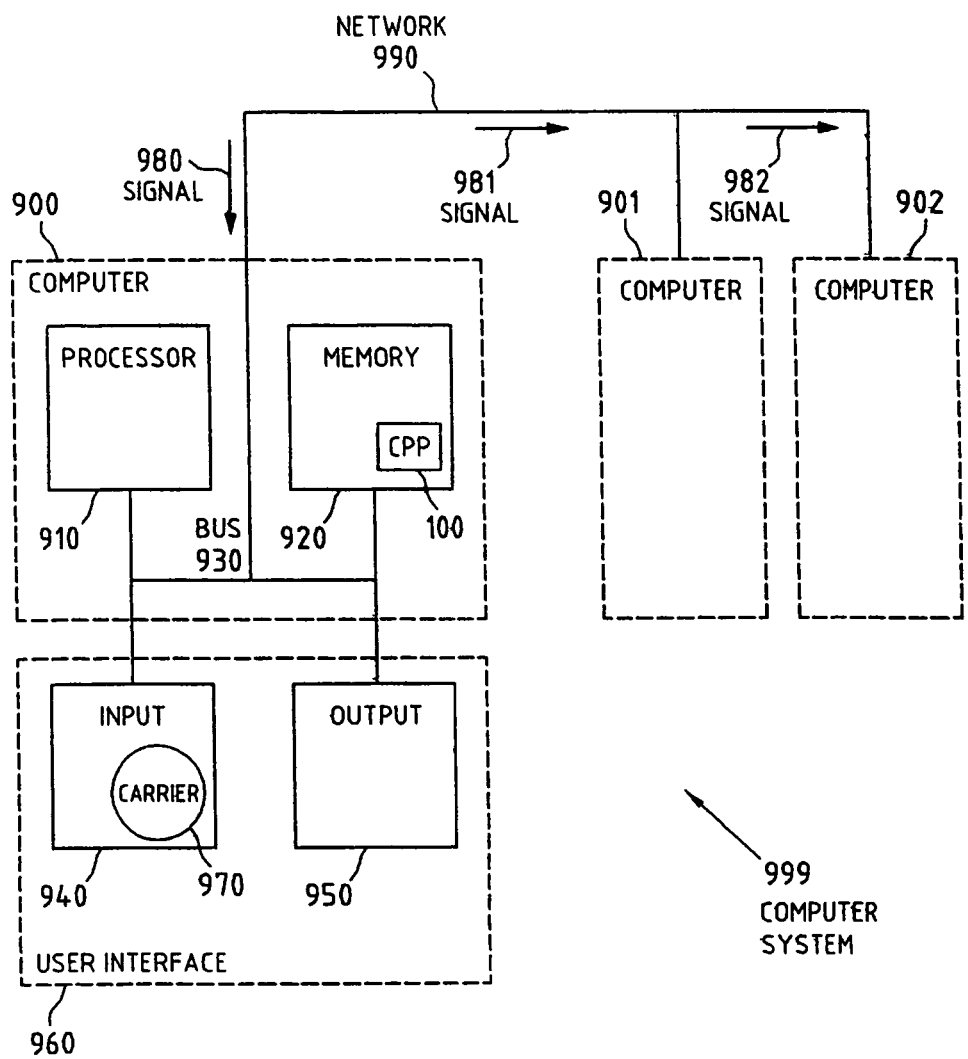
FIG. 1 illustrates a block diagram of an exemplary computer-system, consistent with an embodiment of the invention.
Figure 2:
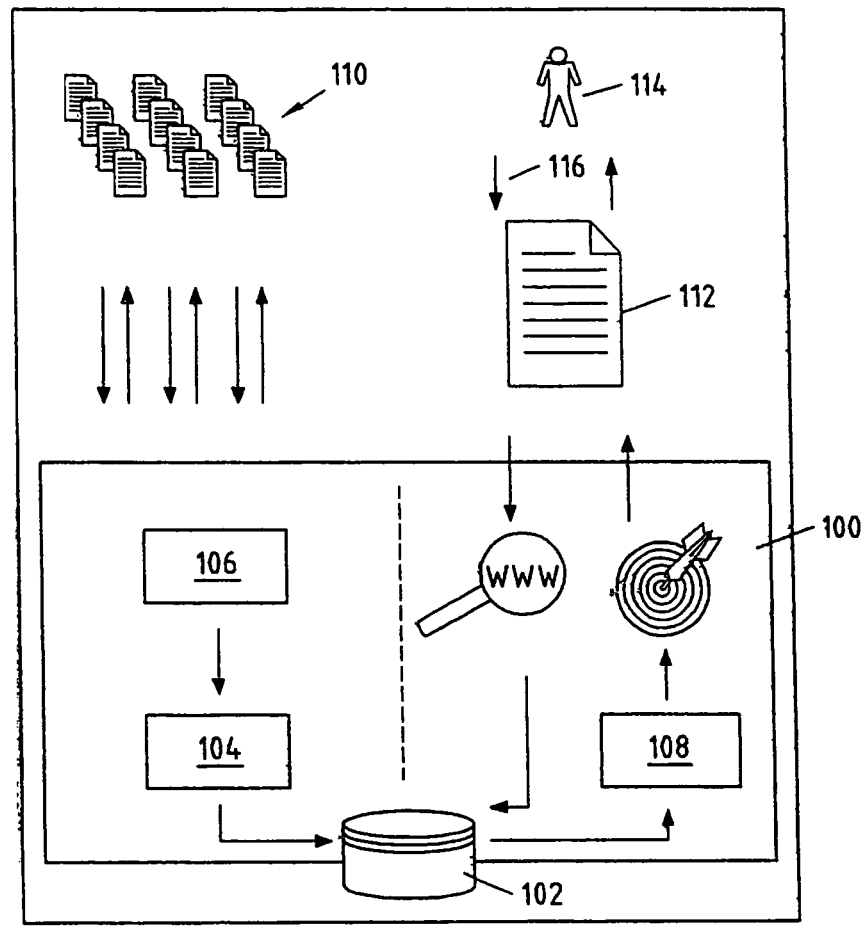
FIG. 2 illustrates a block diagram of a search method within the Internet.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Embodiments consistent with the present invention may be implemented by computer systems, including computers within a computer network. An example is illustrated in connection with FIG. 1.

FIG. 1 illustrates a simplified block diagram of exemplary computer system 999 comprising a plurality of computers 900, 901, 902 (or even more).

Computer 900 can communicate with computers 901 and 902 over network 990. Computer 900 includes processor 910, memory 920, bus 930, and, optionally, input device 940 and output device 950 (I/O devices, user interface 960). As illustrated, embodiments of the invention may be implemented by computer program product 100 (CPP), carrier 970, and/or signal 980.

With respect to computer 900, computer 901/902 may sometimes be referred to as a "remote computer." Computer 901/902 is, for example, a server, a peer device, or other common network node. Computer 901/902 may include many or all of the elements described relative to computer 900.

Computer 900 is, for example, a conventional personal computer (PC), a desktop device or a hand-held device, a multiprocessor computer, a pen computer, a microprocessor-based or programmable consumer electronics device, a minicomputer, a mainframe computer, a personal mobile computing device, a mobile phone, a portable or stationary personal computer, a palmtop computer, or the like.

Processor 910 is, for example, a central processing unit (CPU), a micro-controller unit (MCU), digital signal processor (DSP), or the like.

Memory 920 comprises elements that temporarily or permanently store data and instructions. Although memory 920 is illustrated as part of computer 900, memory can also be implemented in network 990, in computers 901/902, in processor 910 itself (e.g., cache, register), or elsewhere. Memory 920 can be a read only memory (ROM), a random access memory (RAM), or a memory with other access options. In one embodiment, memory 920 is physically implemented by computer-readable media, for example: (a) magnetic media, like a hard disk, a floppy disk, or other magnetic disk, a tape, a cassette tape; (b) optical media, like optical disk (CD-ROM, digital versatile disk—DVD); or (c) semiconductor media, like DRAM, SRAM, EPROM, EEPROM, memory stick.

Optionally, memory 920 is distributed. Portions of memory 920 can be removable or non-removable. For reading from media and for writing in media, computer 900 may use well-known devices, for example, disk drives, or tape drives.

Memory 920 stores modules such as, for example, a basic input output system (BIOS), an operating system (OS), a program library, a compiler, an interpreter, and/or a text-processing tool. Modules are commercially available and can be installed on computer 900. For simplicity, these modules are not illustrated.

CPP 100 comprises program instructions and—optionally—data that cause processor 910 to execute methods consistent with the present invention. In other words, CPP 100 can control the operation of computer 900 and its interaction in network system 999 so that is operates to perform methods consistent with the invention. For example and without the intention to be limiting, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture having a computer readable medium with computer readable program code to cause the computer to perform methods consistent with the present invention. Further, signal 980 can also embody computer program product 100.

Having described CPP 100, carrier 970, and signal 980 in connection with computer 900 is convenient. Optionally, further carriers and signals embody computer program products (CPP) to be executed by further processors in computers 901 and 902.

Input device 940 provides data and instructions for processing by computer 900. Device 940 can be a keyboard, a pointing device (e.g., mouse, trackball, cursor direction keys), microphone, joystick, game pad, scanner, or disc drive. Although the examples are devices with human interaction, device 940 can also be a device without human interaction, for example, a wireless receiver (e.g., with satellite dish or terrestrial antenna), a sensor (e.g., a thermometer), or a counter (e.g., a goods counter in a factory). Input device 940 can serve to read carrier 970.

Output device 950 presents instructions and data that have been processed. For example, this can be a monitor or a display, a cathode ray tube (CRT)), a flat panel display, a liquid crystal display (LCD), a speaker, a printer, a plotter, and/or a vibration alert device. Output device 950 can communicate with the user, but it can also communicate with further computers.

Input device 940 and output device 950 can be combined to a single device. Alternatively, device 940 and/or 950 can be provided optional.

Bus 930 and network 990 provide logical and physical connections by conveying instruction and data signals. While connections inside computer 900 are conveniently referred to as "bus 930", connections between computers 900-902 are referred to as "network 990". Optionally, network 990 includes gateways that are computers that specialize in data transmission and protocol conversion.

Devices 940 and 950 are coupled to computer 900 by bus 930 (as illustrated) or by network 990 (optional). While the signals inside computer 900 are mostly electrical signals, the signals in network may be electrical, electromagnetic, optical or wireless (radio) signals.

Networks are commonplace in offices, enterprise-wide computer networks, intranets and the Internet (e.g., the world wide web or WWW). Network 990 can be a wired or a wireless network. To name a few network implementations, network 990 can be, for example, a local area network (LAN), a wide area network (WAN), a public switched telephone network (PSTN), an Integrated Services Digital Network (ISDN), an infra-red (IR) link, a radio link, like Universal Mobile Telecommunications System (UMTS), Global System for Mobile Communication (GSM), Code Division Multiple Access (CDMA), or a satellite link.

A variety of transmission protocols, data formats and conventions is known, for example, as transmission control protocol/internet protocol (TCP/IP), hypertext transfer protocol (HTTP), secure HTTP, wireless application protocol (WAP), unique resource locator (URL), a unique resource identifier (URI), a hypertext markup language (HTML), an extensible markup language (XML), an extensible hypertext markup language (XHTML), a wireless markup language (WML), and a Standard Generalized Markup Language (SGML).

Interfaces coupled between the elements are well known in the art. For simplicity, interfaces are not illustrated in FIG. 1. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides" are convenient abbreviations to express actions by a computer that is controlled by a program.

Figure 3:
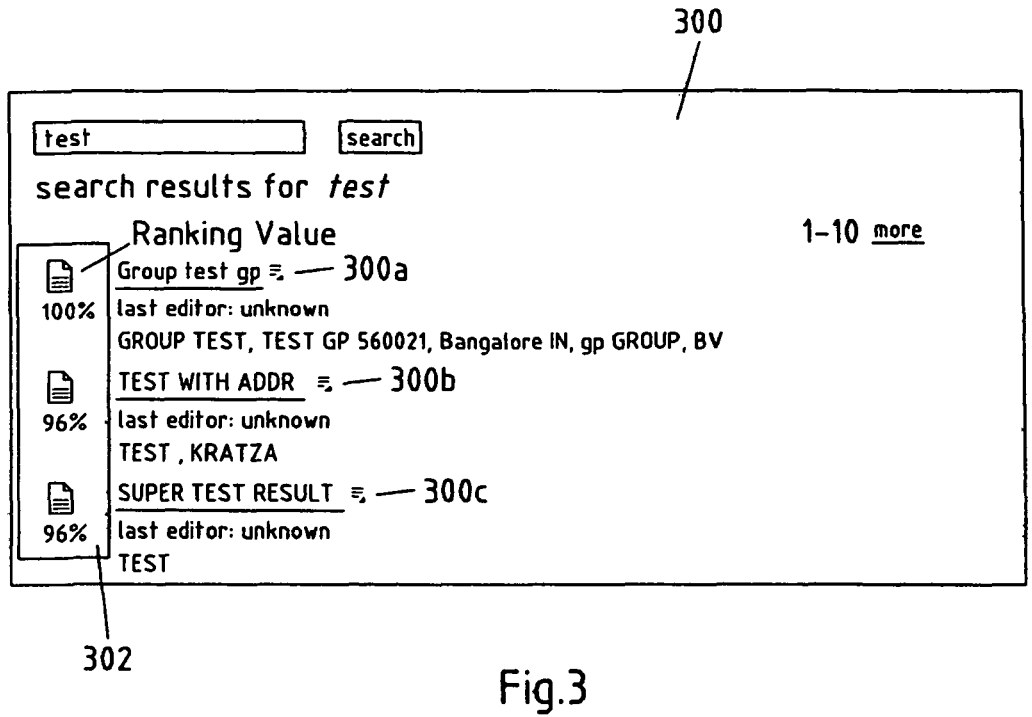
FIG. 3 illustrates an exemplary hitlist of business objects after a search engine based search, consistent with an embodiment of the invention.

FIG. 3 depicts a screenshot of an exemplary hitlist 300, consistent with an embodiment of the present invention. Hitlist 300 includes relevant links 300*a*-*c* to business objects after execution of a search with a search engine for a search query, in this case the word "test". Together with the relevant links 300*a*-*c*, a ranking value 302 is presented. The ranking value 302 comprises information about the relevance of each respective link 300*a*-*c*. The ranking value 302 may be calculated according to a ranking algorithm.

Known ranking algorithms use documents of Internet pages for indexing and calculating their relevance. It is known to use references (hyperlinks) of web pages to other web pages to calculate the ranking value of the linked web pages. A web page referenced to by many other web pages may have a higher-ranking value than a web page which is less referenced to.

The drawback of such known methods is that they only allow calculating a ranking value for web pages and documents rather than for business objects. But as business objects may also be mapped into documents as depicted in FIG. 4, it should be possible to use the information within the business objects to provide a ranking value for the business objects.

Figure 4:
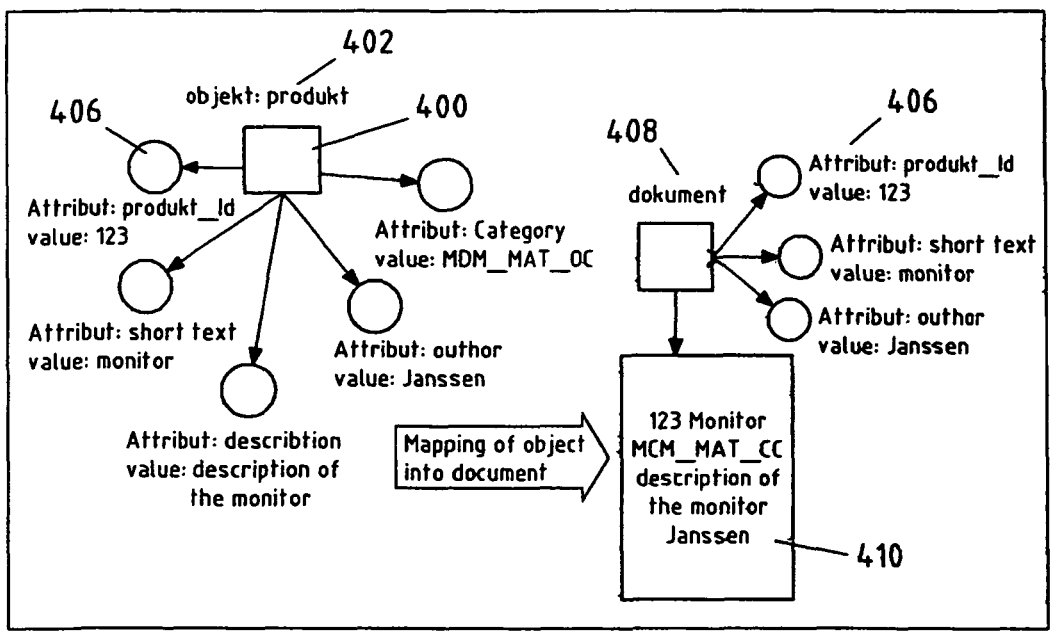
FIG. 4 demonstrates an exemplary method for mapping a business object into a document structure, consistent with an embodiment of the invention.

FIG. 4 depicts, in accordance with an embodiment of the invention, a business object 400 that is of an object type 402. The business object 400 comprises attributes 406. Each attribute 406 has a value. Enabling the search within business objects, it may be necessary to map these business objects into document structures 408. A document structure 408 comprises content 410. The content 410 comprises all searchable business object attributes 406 of the business objects. The document structure 408 may, therefore, comprise attributes and its values of the business object 400. All values of the attributes 406 of the business objects 400 may be mapped as content into document structure 408. Furthermore, certain attribute 406 of the business objects 400 may be used for defining attributes 406 of a new document 408. The documents 408 may be used by search engines for indexing. This indexing might be necessary prior to providing search functionality. The search engine provides a ranking value for the documents 408. The ranking value may be calculated based on a ranking-algorithm for each document 408.

Figure 5:
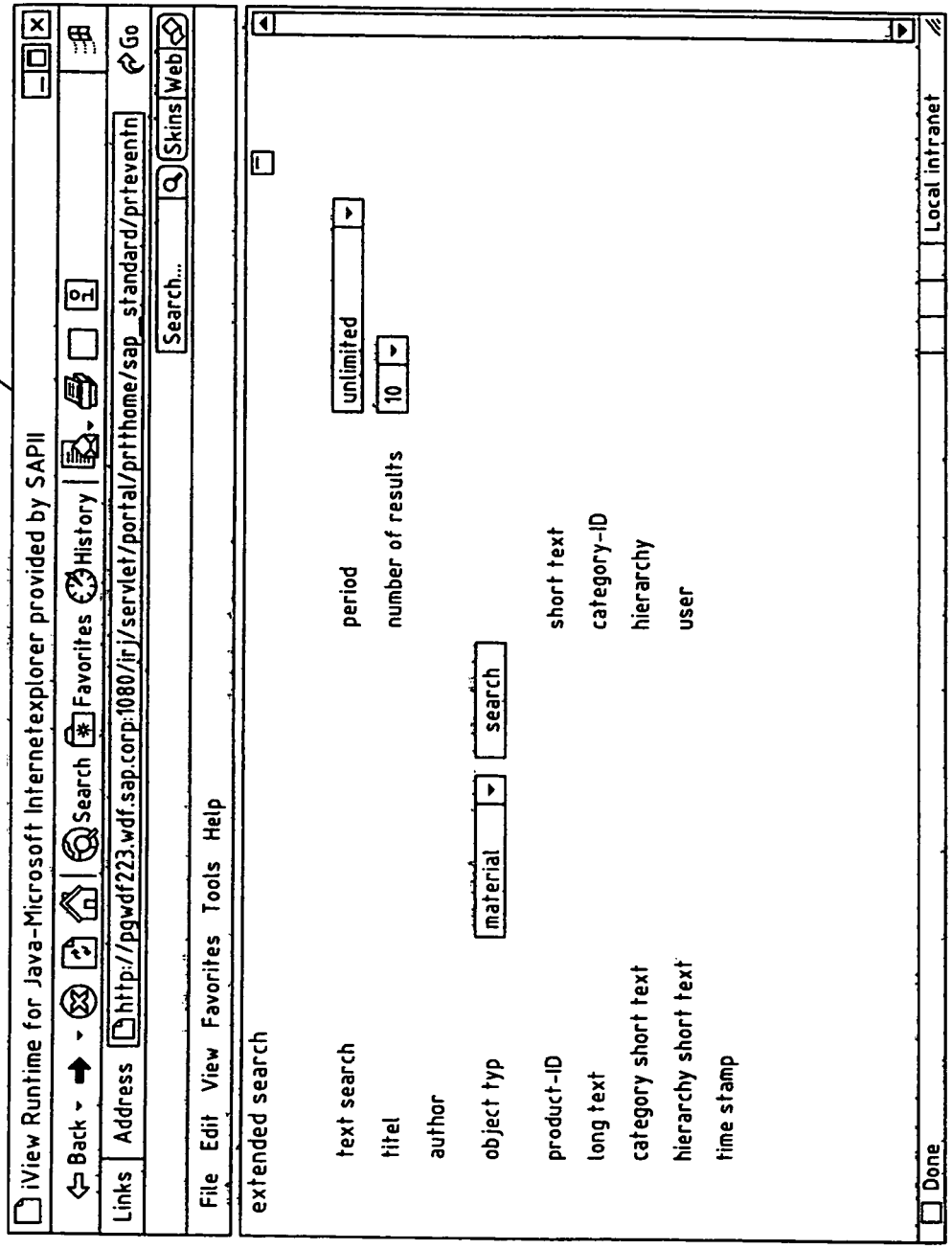
FIG. 5 illustrates an exemplary user interface of an advanced search for business objects, consistent with an embodiment of the invention.

FIG. 5 depicts an exemplary screen shot of a search engine user interface 112, consistent with an embodiment of the invention. With this user interface 112, it is possible to restrict the search to a certain object attribute or certain object types. For defining the search, the user may provide generic and/or specific object attributes. Generic attributes may include, for example, a title, an author, a creation date, or other. Specific object attributes may include, for example, a product ID, a short text, or other. By using the depicted user interface 112, the user may define his/her search more precisely than just by typing in one word as a search query.

Figure 6:
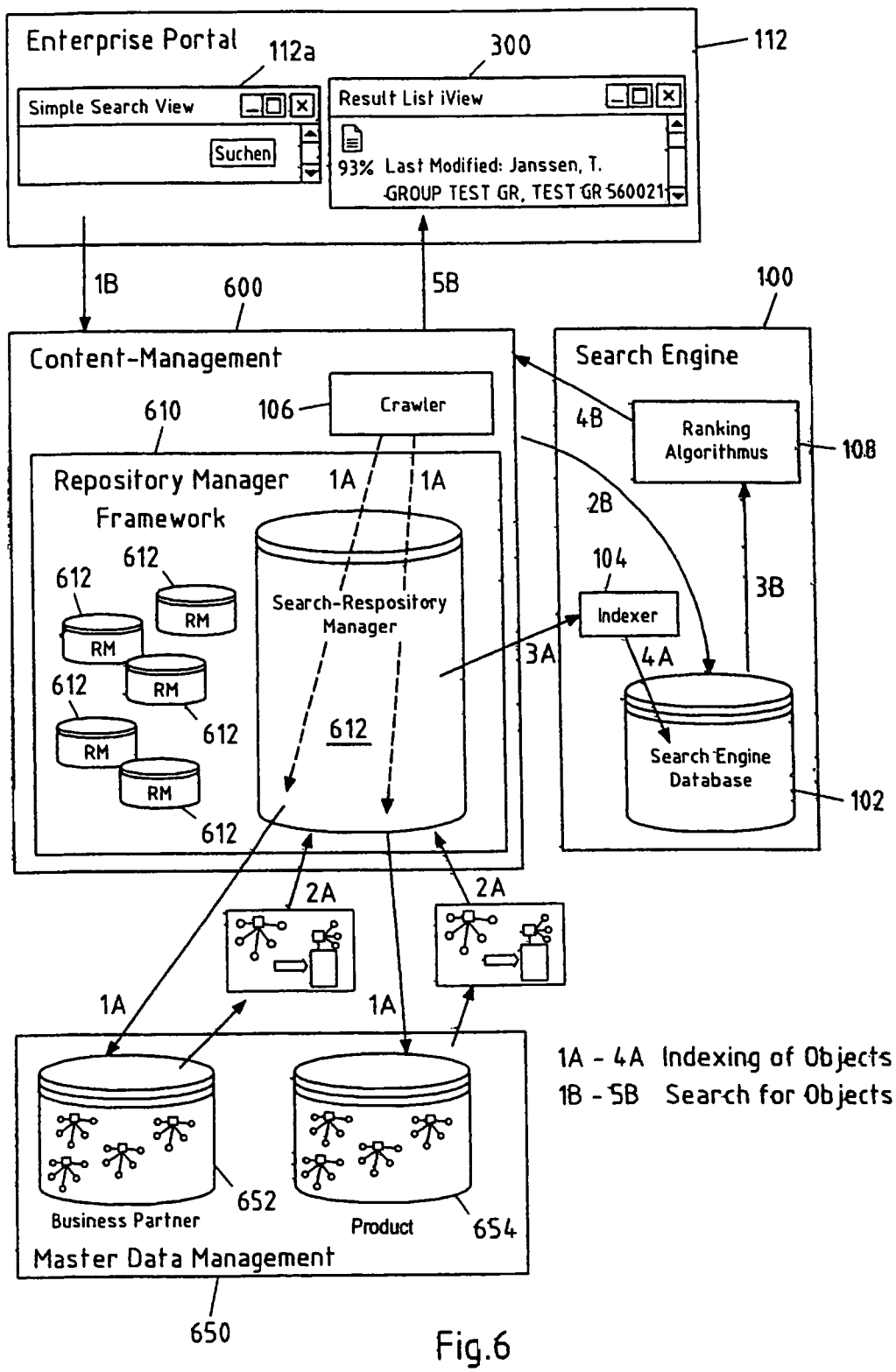
FIG. 6 is a block diagram of an exemplary search method for business objects, consistent with an embodiment of the invention.

FIG. 6 depicts an exemplary search method for business objects, consistent with an embodiment of the invention. Depicted is a search engine user interface 112, comprising an input field 112*a* and a hitlist 300. Further depicted is a content manager 600, a search engine 100 and a master data management 650. The content manager 600 comprises a crawler 106 and a repository manager framework 610. The repository manager framework 610 may comprise many repository managers. One of the repository managers may be a search repository manager 612.

In the exemplary embodiment of FIG. 6, search engine 100 may comprise ranking means 108, a search engine database 102 and an indexer 104. Further, master data management 650 may comprise databases for different business objects, such as a business partner data base 652 and a product database 654.

Content manager 600 may enable access of a search engine 100 to the available data. Within the content manager 600, repository manager framework 610 may be implemented. In one embodiment, this repository manager framework 610 provides interfaces for implementing a variety of repository managers. Each repository manager may provide functionality to the content management 600. One of the functionalities may be search functionality for business objects, which is in this case a search repository manager 612. For each object type, a certain repository manager type 612 may be implemented. For each object type, such as business partner 652 and product 654, a particular search repository manager 612 may be implemented. The implementation may be object oriented.

In FIG. 6, the steps 1A-4A may refer to indexing, and the steps 1B-5B may refer to searching.

For searching business objects, the objects must first be indexed. For indexing the objects, the following steps may be carried out. In step 1A, a crawler 106 requests all business objects within master data management 650. This request 1A initiates the mapping of business partner business objects and product business objects into a document structure, in step 2A. Such a document structure may be derived from the exemplary embodiment of FIG. 4. While mapping the business objects into the document structures, all information of the business object, in particular all relevant attributes, is mapped into the document structure. Furthermore, certain attributes of the business objects may be defined as document attributes. The mapping of business objects into document structures may be carried out for all different types of business objects within master data management 650. The resulting documents are provided to search repository manager 612. Within search repository manager 612, these documents are stored and provided to indexer 104, in step 3A. Indexer 104 indexes all documents, in particular the content of the documents, and provides the index to search engine database 102, in step 4A. After that, a search for business object is possible.

The user may provide a search query, which is sent to content manager 600, in step 1B. Content manager 600 prepares the search query to be forwarded to search engine 100. Within step 2*b*, the search query is forwarded to search engine 100. Within search engine 100, documents with relevance for the search query are searched using search engine database 102. All relevant documents that match the search query may be passed to ranking means 108, in step 38. Within ranking means 108 a ranking value between 0 and 1 may be calculated according the relevance of the documents provided.

This relevance may also be based on the number of words found in the documents matching a search query, the position of the words within the document, the distance of the matching words within the document, the frequency of the words within the documents, and/or the absolute frequency of the words within all or some of the documents.

Furthermore, the position of the words matching the search query may be used. Further, the relevance may be the link popularity of the document, the result of a link text analysis, a click popularity, and/or the depth of levels of the document.

All these factors do not reflect the relevance of references between the business objects. Therefore, together with the common attributes of the business objects, particular attributes reflecting the references between the business objects, may be mapped into the document structure, in step 2A.

Therefore, a new object attribute may be defined, which accounts for the number of references referring to the particular business object. After that, the number of references to a business object is counted and the value of the particular attribute is calculated.

Consistent with an aspect of the invention, ranking means 108 may provide a hitlist. The position of the objects within the hitlist may be checked within content manager 600. First of all, the number of references value is checked. The business object with the highest number of reverences value is placed first within the hitlist, e.g., gets the highest ranking value. In case the number of references value is equal for two business objects, the integrity of business partner data within business partner business objects is checked. The more business partner data are available, the higher the ranking of the particular business object.

Further, ranking values for each business object may be used for creating the ranking of the hitlist. In step 5B, the hitlist 300 is provided to search engine user interface 112 and presented to the user.

Figure 7:
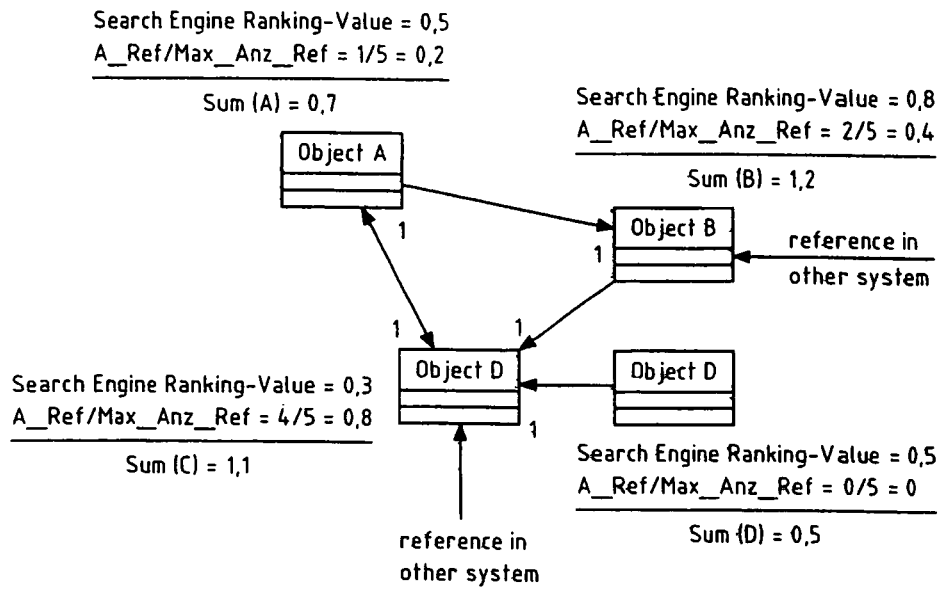
FIG. 7 provides a diagram of an exemplary method for creating a ranking value of business objects, consistent with an embodiment of the invention.

FIG. 7 depicts an exemplary process for calculating a search engine ranking value for different business objects, consistent with an embodiment of the invention. In the example of FIG. 7, four objects are depicted. These objects reference to each other with a total amount of references of five. Object A references to object C and object B. Object B references to object C, object C references to object A and object D references to object C. Business objects A-D may be, for instance, of the same or different object type and within the same system.

Business objects of different systems (not depicted) may also reference to the business object depicted. In the present case, object C is referenced to from a business object of another system. Also object B is referenced to from a business object of another system. The business objects depicted in FIG. 7 have an over-all number of references of five.

Object A is referenced to only once. Therefore, the quotient of number of references and the maximum number of references for object A is 0.2. For object B, it is 0.4, for object C it is 0.8, and for object D it is 0. The sum of the search engine ranking value and the calculated quotient is also depicted in FIG. 7.

Figure 8:
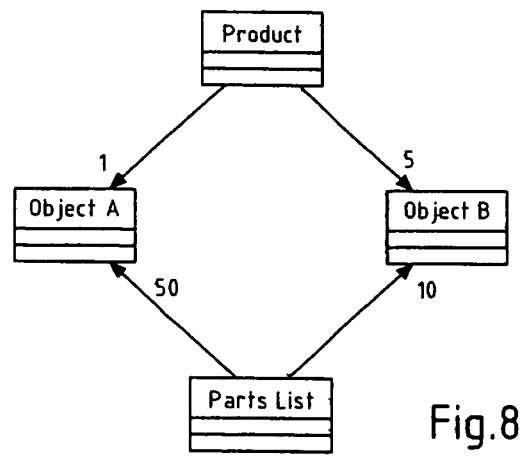
FIG. 8 provides a diagram of an exemplary method for creating a ranking value considering the object type, consistent with an embodiment of the invention.

It is also possible that references of business objects of different object types are accounted for. In many cases, references of certain object types occur more often than references from other object types. As depicted in FIG. 8, business objects of the object types parts lists refer fifty times to object A and ten times to object B. Business objects of the object type product only refer once to object A and five times to object B. In this case, the ranking value should be calculated for object A as the number of references from objects of the type product (in this case 1) divided by the overall number of references of the type product (in this case 6). A ranking value for parts list is for object A the quotient of 50 and 10. The same applies for object B. In this case, the effect of references from objects of types, which refer to other objects more often, is limited. This is a more balanced approach.

Figure 9:
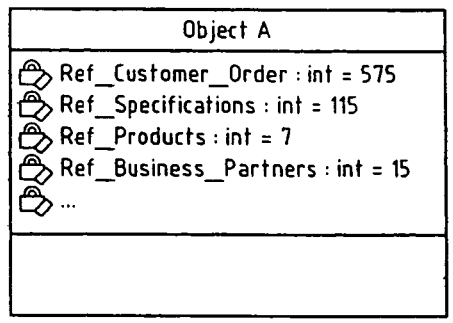
FIG. 9 provides a diagram of an exemplary object class, consistent with an embodiment of the invention.

For each business object, attributes may be defined which comprise the number of references of different business objects of a particular type, respectively. As depicted in FIG. 9, for object A, various different attributes are defined. Each of these attributes comprises the number of references a business object of the particular object type refers to object A. These attributes may also be mapped onto the document structure. With these documents it is possible for a user of a certain role to personalize the ranking value according to its role. For example, for each role references of different object types more important than other, the number of references may be weighted according to the corresponding object type.

Figure 10:
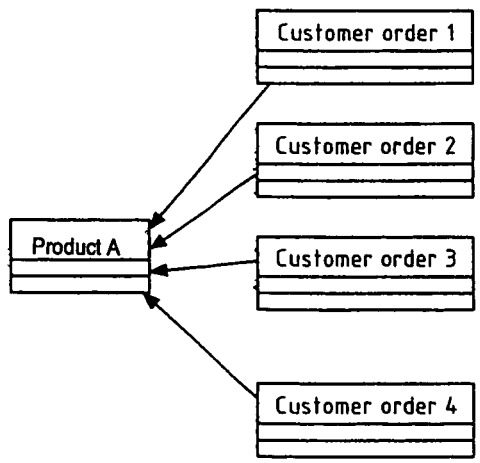
FIG. 10 provides a diagram of exemplary product and customer orders, consistent with an embodiment of the invention.

For instance, a product may be referenced by customer orders, as depicted in FIG. 10. The references of customer orders to a product may be of a higher relevance for a ranking value than a material reference to a product in case products are searched by customers. It may be the other way in case products are searched by product designers, as these user roles are more interested in materials used in products than in the number of customer orders.

By providing the calculation of a ranking value according to business objects specific references, it is possible to search business object more precisely. The search results and the hitlists are easier to use for a user and provide better search results.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method for creating a ranking value of a first business object according to its relevance for a search query, said method comprising:
   a processor coupled to a memory, in which the memory stores instructions, and when executed on the processor, causes the processor to perform the steps of:
   determining a reference value according to a number of references to said first business object, the business objects including the reference value indicating a number of times the business object is referenced within at least one of an other business objects at least one attribute value, wherein at least one of the other business objects includes a data set that remains constant as an update becomes available, and a data set that changes as the updates become available;
   mapping the first business object into a document structure;
   mapping said reference value into said document structure;
   indexing said document structure for use in a search engine;
   calculating said ranking value based on the reference value; and
   adjusting the ranking value based on the at least one attribute value when the reference value indicates that the number of references to said first business object is equal to a number of references to a second business object within the other business objects, wherein business partner attributes of the other business objects are mapped into said document structure; and said ranking value is calculated further depending on a completeness of said business partner attributes.

2. The computer-implemented method of claim 1, wherein attributes of said first business object are mapped into attributes of said document structure.

3. The computer-implemented method of claim 1, wherein the other business objects are searched for references to the first business object and, in case of a reference from another business object, said reference value is increased.

4. The computer-implemented method of claim 1, wherein said first business object comprises a tag, said tag is mapped into said document structure, and said ranking value is calculated further depending on said tag.

5. The computer-implemented method of claim 1, wherein said first business object comprises a delete tag, said delete tag is mapped into said document structure, and said ranking value is calculated further depending on said delete tag.

6. The computer-implemented method of claim 1, wherein said ranking value is a value between 0 and 1.

7. The computer-implemented method of claim 1, wherein said ranking value is calculated as a quotient between the reference value and a maximum number of references to one of the other business objects.

8. The computer-implemented method of claim 7, wherein a new ranking value is calculated depending on the addition of ranking values calculated by said search engine and said quotient ranking value.

9. The computer-implemented method of claim 7, wherein a new ranking value is calculated depending on the multiplication of a ranking value calculated by said search engine and said quotient ranking value.

10. The computer-implemented method of claim 1, wherein the first business object and the other business objects are dedicated to certain business object types, and said number of references to said other business objects are calculated within the same type.

11. The computer-implemented method of claim 10, wherein reference values are mapped into said document structure for each business object type, separately.

12. The computer-implemented method of claim 10, wherein said ranking value is calculated by adding reference values to said first business object for each business object type, respectively.

13. The computer-implemented method of claim 10, wherein number of references to said first business object for each business object type is divided by a maximum number of references to business objects of the respective type.

14. The computer-implemented method of claim 1, wherein each user is characterized by a role, and said ranking value is calculated based on said reference value and said role of said user.

15. The computer-implemented method of claim 14, wherein references to a first business object are weighted according to said role of said user and wherein said ranking value is calculated based on said weighted number of references.

16. The computer-implemented method of claim 1, wherein each business object comprises, attributes and wherein at least parts of said attributes are mapped into said document structure.

17. The computer-implemented method of claim 1, wherein attributes relevant for said ranking value are mapped into said document structure.

18. The computer-implemented method of claim 1, wherein said first business object and other business objects comprise a set of data with specific attributes.

19. The computer-implemented method of claim 1, wherein each business object comprises generic and/or specific attributes.

20. A computer program product tangibly embodied in a computer-readable storage medium comprising instructions, which when executed on a processor for creating a ranking value of a first business object according to its relevance for a search query cause the processor to:
   determine a reference value according to a number of references to said first business object, the business objects including the reference value indicating a number of times the business object is referenced within at least one of an other business objects at least one attribute value, wherein at least one of the other business objects includes a data set that remains constant as an update becomes available, and a data set that changes as the updates become available;
   map the first business object into a document structure;
   map said reference value into said document structure;
   index said document structure for use in a search engine;
   calculate said ranking value based on the reference value; and
   adjust the ranking value based on the at least one attribute value when the reference value indicates that the number of references to said first business object is equal to a number of references to a second business object within the other business objects, wherein business partner attributes of the other business objects are mapped into said document structure; and said ranking value is calculated further depending on a completeness of said business partner attributes.

21. The computer program product of claim 20, wherein the instructions are operable to cause the processor to map the attributes of said first business object into attributes of said other business objects.

22. The computer program product of claim 20, wherein the instructions are operable to cause the processor to search the first business object for references to other business objects, and increase said reference value in case of a reference from another business object.

23. The computer program product of claim 20, wherein the instructions are operable to cause the processor to map a tag into said document structure, and calculate said ranking value further depending on said tag.

24. The computer program product of claim 20, wherein the instructions are operable to cause the processor to map a delete tag into said document structure, and calculate said ranking value further depending on said delete tag.

25. The computer program product of claim 20, wherein the instructions are operable to cause the processor to create said ranking value between 0 and 1.

26. The computer program product of claim 20, wherein the instructions are operable to cause the processor to calculate said ranking value as a quotient between the reference value and a maximum number of references to one of the other business objects.

27. The computer program product of claim 26, wherein the instructions are operable to cause the processor to calculate a new ranking value based on the addition of said ranking value said quotient ranking value.

28. The computer program product of claim 26, wherein the instructions are operable to cause the processor to calculate a new ranking value based on the multiplication of said ranking value and said quotient ranking value.

29. The computer program product of claim 20, wherein the instructions are operable to cause the processor to dedicate the first business object and other business objects to certain business object types, and to calculate reference values for said first business object within the same type.

30. The computer program product of claim 29, wherein the instructions are operable to cause the processor to map said reference values into said document structure for each business object type, separately.

31. The computer program product of claim 29, wherein the instructions are operable to cause the processor to calculate said ranking value by adding the reference values for each business object type.

32. The computer program product of claim 29, wherein the instructions are operable to cause the processor to divide the reference values for each business object type by a maximum number of references to business objects of the respective type.

33. The computer program product of claim 20, wherein the instructions are operable to cause the processor to characterize each user by a role, and calculate said ranking value based on said reference value and said role of said user.

34. The computer program product of claim 33, wherein the instructions are operable to cause the processor to weight references to the first business object according to said role of said user and calculate said ranking value based on said weighted number of references.

35. The computer program product of claim 20, wherein the instructions are operable to cause the processor to map at least parts of attributes of the other business objects into said document structure.

36. The computer program product of claim 20, wherein the instructions are operable to cause the processor to map attributes relevant for said ranking value into said document structure.

37. A computer for creating a ranking value of a business object according to its relevance for a search query comprising:
   a processor;
   determination means for determining a reference value according to a number of references to said first business object, the business objects including the reference value indicating a number of times the business object is referenced within at least one of an other business objects at least one attribute value, wherein at least one of the other business objects includes a data set that remains constant as an update becomes available, and a data set that changes as the updates become available;
   mapping means for mapping the first business object into a document structure and mapping said reference value into said document structure;

indexing means for indexing said document structure for use in a search engine;

calculating means for calculating said ranking value based on the reference value, wherein the calculating means adjusts the ranking value based on the at least one attribute value when the reference value indicates that the number of references to said first business object is equal to a number of references to a second business object within the other business objects, wherein business partner attributes of the other business objects are mapped into said document structure; and said ranking value is calculated further depending on a completeness of said business partner attributes.

38. The computer of claim 37, further comprising searching means for searching the first business object for references to other business objects, and means for increasing said reference value in case of a reference from another business object.

39. The computer of claim 37, wherein said mapping means map a tag into said document structure, and wherein said calculation means calculate said ranking value further depending on said tag.

40. The computer of claim 37, wherein said mapping means map a delete tag into said document structure, and wherein said calculation means calculate said ranking value further depending on said delete tag.

41. The computer of claim 37, wherein said calculation means calculate said ranking value as a quotient between a number of references to said first business object and a maximum number of references to one of the other business objects.

42. The computer of claim 41, wherein said calculation means calculate a new ranking value depending on the addition of the ranking value calculated by said search engine and said quotient ranking value.

43. The computer of claim 37, wherein said calculation means calculate a new ranking value depending on the multiplication of the ranking value calculated by said search engine and said quotient ranking value.

44. The computer of claim 37, wherein said calculation means calculate a number of references to the first business object within business objects of a same type included in the other business objects.

45. The computer of claim 44, wherein said mapping means mapping reference values into said document structure for each business object type, separately.

46. The computer of claim 44, wherein said calculation means calculate said ranking value by adding the reference values for each business object type, separately.

47. The computer of claim 44, wherein said calculation means divide a number of references to said first business object for each business object type by a maximum number of references to business objects of the respective type.

48. The computer of claim 37, wherein said calculation means calculate said ranking value depending on the reference value and a role of said user.

49. The computer of claim 48, wherein weighting means weight references to the first business object according to said role of said user and wherein said calculation means calculate said ranking value depending on said weighted number of references.

50. The computer of claim 37, wherein said mapping means map least parts of attributes of business objects into said document structure.

51. The computer of claim 37, wherein said mapping means map attributes relevant for said ranking value into said document structure.

* * * * *